United States Patent
Iren et al.

(10) Patent No.: US 7,073,021 B2
(45) Date of Patent: Jul. 4, 2006

(54) SEMANTICALLY-AWARE, DYNAMIC, WINDOW-BASED DISC SCHEDULING METHOD AND APPARATUS FOR BETTER FULFILLING APPLICATION REQUIREMENTS

(75) Inventors: Sami Iren, Pittsburgh, PA (US); Alma Riska, Pittsburgh, PA (US); Erik Riedel, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 280 days.

(21) Appl. No.: 10/393,566

(22) Filed: Mar. 21, 2003

(65) Prior Publication Data

US 2004/0186951 A1    Sep. 23, 2004

(51) Int. Cl.
*G06F 12/00* (2006.01)
(52) U.S. Cl. ........................... 711/112; 711/158
(58) Field of Classification Search ............. 711/158, 711/167
See application file for complete search history.

(56) References Cited

U.S. PATENT DOCUMENTS

| | | | |
|---|---|---|---|
| 5,522,054 A | 5/1996 | Gunlock et al. | |
| 5,644,786 A | 7/1997 | Gallagher et al. | |
| 5,761,692 A | 6/1998 | Ozden et al. | |
| 5,787,482 A * | 7/1998 | Chen et al. | 711/158 |
| 6,078,998 A | 6/2000 | Kamel et al. | |
| 6,212,565 B1 * | 4/2001 | Gupta | 709/229 |
| 6,301,639 B1 | 10/2001 | Cleavinger et al. | |
| 6,378,052 B1 | 10/2001 | Genduso et al. | |
| 6,412,058 B1 | 6/2002 | Houston et al. | |

FOREIGN PATENT DOCUMENTS

EP    0757310 A2    2/1997

OTHER PUBLICATIONS

M. Seltzer et al., "Disk Scheduling Revisited," *Proceedings of the USENIX Winter 1990 Technical Conference*, Berkeley, CA, USENIX Association, 1990, 11 pages.
A. L. N. Reddy et al., "I/O Issues in a Multimedia System," *IEEE Computer*, vol. 27, No. 3, Mar. 1994, 22 pages.
D. J. Gemmell et al., "Multimedia Storage Servers: A Tutorial," *IEEE Computer*, vol. 28, No. 5, 1995, 26 pages.

(Continued)

*Primary Examiner*—Mano Padmanabhan
*Assistant Examiner*—Duc T Doan
(74) *Attorney, Agent, or Firm*—Robert P. Lenart, Esq.; Pietragallo, Bosick & Gordon LLP

(57) ABSTRACT

A method for processing requests for information from a disc drive comprising: (a) receiving a plurality of requests, wherein each of the requests has application level information associated with it; (b) identifying a first group of the requests that fit within a time interval; (c) using a scheduling algorithm with disc information to schedule one of the requests in the first group; (d) adjusting the length of the time interval; (e) identifying another group of the requests that fit within the adjusted time interval; (f) using the scheduling algorithm to schedule one of the requests in the other group; and (g) repeating steps (d), (e) and (f). An apparatus that processes requests for information in accordance with the method is also provided.

20 Claims, 3 Drawing Sheets

OTHER PUBLICATIONS

Y. Romboyannakis et al., "Disk Scheduling for Mixed-Media Workloads in a Multimedia Server," *Proceedings of the Sixth ACM International Conference on Multimedia*, ACM Press, 1998, 12 pages.

R. Steinmetz et al., *Multimedia: Computing, Communications and Applications*, Chapter 9, Prentice Hall, Upper Saddle River, NJ 07458, (1995), pp. 281-290.

* cited by examiner

SEMANTICALLY-AWARE, DYNAMIC, WINDOW-BASED DISC SCHEDULING METHOD AND APPARATUS FOR BETTER FULFILLING APPLICATION REQUIREMENTS

FIELD OF THE INVENTION

This invention relates to methods and apparatus for retrieving data stored on a disc, and more particularly to such methods that are applicable to applications with quality of service (QoS) requirements, such as multimedia applications.

BACKGROUND OF THE INVENTION

High bandwidth and Quality of Service (QoS) requirements of continuous (multimedia) data such as audio and video pose numerous performance related challenges. The stringent QoS requirements of most audio/video applications require on-time delivery of pieces of data from the source (the disc where the media is stored) all the way to the destination (the client where it is played back). Missing the delivery deadlines may result in user-noticeable degradation of the playback quality, called glitches.

Disc scheduling algorithms can be classified into three groups: (1) algorithms that are designed for general purpose disc access (mostly for discrete data access), (2) algorithms for continuous data (e.g., video/audio streams), and (3) algorithms for mixed-media workloads.

The First Come First Served (FCFS) disc scheduling. algorithm accepts requests one at a time and serves them in order. This is an easy to implement and intrinsically fair algorithm. However, numerous studies have shown that FCFS often results in suboptimal performance due to high average seek and rotation time.

The Shortest Seek Time First (SSTF) algorithm chooses among all requests the one with the minimum seek time from the current head position. This algorithm minimizes seek time. However, this comes at the expense of high response time variance and the starvation of some requests. Requests to the middle of the disc will get immediate service at the expense of requests to the innermost/outermost disc areas.

The SCAN scheduling algorithm, like SSTF, orders requests to minimize seek time. However, unlike SSTF, it also takes the direction of the current disc movement into account. It serves the requests in an elevator-like manner, moving the disc head back and forth across all the cylinders and servicing the requests along the path. It allows seek time optimizations while reducing the response time variance. disc head back and forth across all the cylinders and servicing the requests along the path. It allows seek-time optimizations while reducing the response time variance.

C-SCAN (Cyclical SCAN), a variation of SCAN, always moves the head in one direction. When the head reaches the last cylinder, it returns to the first cylinder without servicing any request along the way. C-SCAN treats each cylinder equally rather than favoring the center cylinders as SCAN does. Although it offers fairer service with more uniform waiting times, its performance is somewhat worse than SCAN.

The LOOK algorithm is another SCAN variation that changes the scanning direction if there is no pending requests to be served in the current direction of travel. C-SCAN and LOOK can be combined resulting in the C-LOOK algorithm.

VSCAN(R) algorithm operates as SSTF except that every time it changes direction it adds a penalty based on the parameter R and the seek distance. When R=1 it reduces to SCAN and when R=0 it reduces to SSTF. Past work suggests that VSCAN(0.2) provides a good balance between average response time and starvation resistance.

The Group Sweeping Scheduling (GSS) algorithm provides a compromise by grouping streams and employing round-robin scheduling for the different groups and SCAN scheduling for the stream's block in a group.

The Continuous Media File System defines several disc scheduling algorithms in terms of slack time, the amount of time the scheduler has before it has to schedule a real-time request. Compressing out slack time is analogous to allowing reordering before a request's deadline.

In the field of disc scheduling Shortest Positioning Time First (SPTF) is the current state-of-the-art algorithm for overall disc scheduling that takes advantage of position based knowledge including seek and rotational latency. However, it does not take advantage of the information from the application. It only optimizes based on the current state of the disc head.

In the field of real-time scheduling, the most widely used scheduling algorithm is Earliest Deadline First (EDF). This algorithm takes advantage of application information, specifically the deadlines by which the requests must be serviced. This algorithm orders all the requests based on their deadlines and schedules the requests with the earliest deadline first. In a disc setting, it suffers from poor resource utilization and overall performance because it does not attempt to reduce the overhead of seek and rotational latency.

SCAN-EDF is a variant of a disc scheduling algorithm which combines EDF and SCAN. Just like EDF, SCAN-EDF services the requests with the earliest deadlines first. If several requests have the same (or approximate) deadline, then SCAN is used to schedule these requests. As a result, the effectiveness of SCAN-EDF algorithm is dependent on how many requests have the same deadline. Variations of this algorithm for combined discrete and continuous (multimedia) workloads have been proposed.

Additional scheduling algorithms have adopted the notion of scheduling in rounds. Each continuous media is divided into multiple fragments. The current fragments for all the active streams are scheduled in a given round. A previous patent proposed the use of a common retrieval period for a similar purpose. All of this previous work is based on application level information for determining the size of the rounds without regard to detailed disc level information.

Scheduling algorithms are optimized by either the application view of the system or the disc view of the system, considered independently. On one hand, scheduling algorithms such as SPTF are purely optimized for disc performance (i.e., minimum response time) but do not meet needs of the real-time applications. On the other hand, scheduling algorithms such as EDF are purely optimized for real-time applications but severely lack disc optimizations.

Not all applications require the same performance and QoS. Storage devices can take advantage of this diversity to keep all the applications satisfied. This type of optimization is not possible today because storage devices see and treat all the data the same and there is no interface defined to specify requirements of each application. Instead, optimization decisions are made by the application (the multimedia server in our case). However, applications lack some of the critical information such as the position of the read/write head on the disc or location of remapped blocks.

There is a need for a scheduling method that takes into account both application considerations and disc considerations.

SUMMARY OF THE INVENTION

A method for processing requests for information from a disc drive comprising: (a) receiving a plurality of requests, wherein each of the requests has application level information associated with it; (b) identifying a first group of the requests that fit within a time interval; (c) using a scheduling algorithm with disc information to schedule one of the requests in the first group; (d) adjusting the length of the time interval; (e) identifying another group of the requests that fit within the adjusted time interval; (f) using the scheduling algorithm to schedule one of the requests in the other group; and (g) repeating steps (d), (e) and (f).

The application level information can be a deadline. The scheduling algorithm can be a Shortest Positioning Time First (SPTF) algorithm. The disc information can comprises one of: a disc surface parameter or disc surface variations. The time interval can encompass the request having the shortest deadline. The time interval can be adjusted based on the number of unscheduled requests. The plurality of requests can be placed in a queue and grouped according to the deadlines. The method can further comprise: outputting information in response to each of the scheduled requests.

In another aspect, the invention encompasses an apparatus for processing requests for information from a disc drive comprising: means for receiving a plurality of requests, wherein each of the requests has application level information associated with it; means for identifying a first group of the requests that fit within a time interval; means for using a scheduling algorithm with disc information to schedule one of the requests in the first group; means for adjusting the length of the time interval; means for identifying another group of the requests that fit within the adjusted time interval; and means for using the scheduling algorithm to schedule one of the requests in the other group.

DETAILED DESCRIPTION OF THE INVENTION

Figure 1:
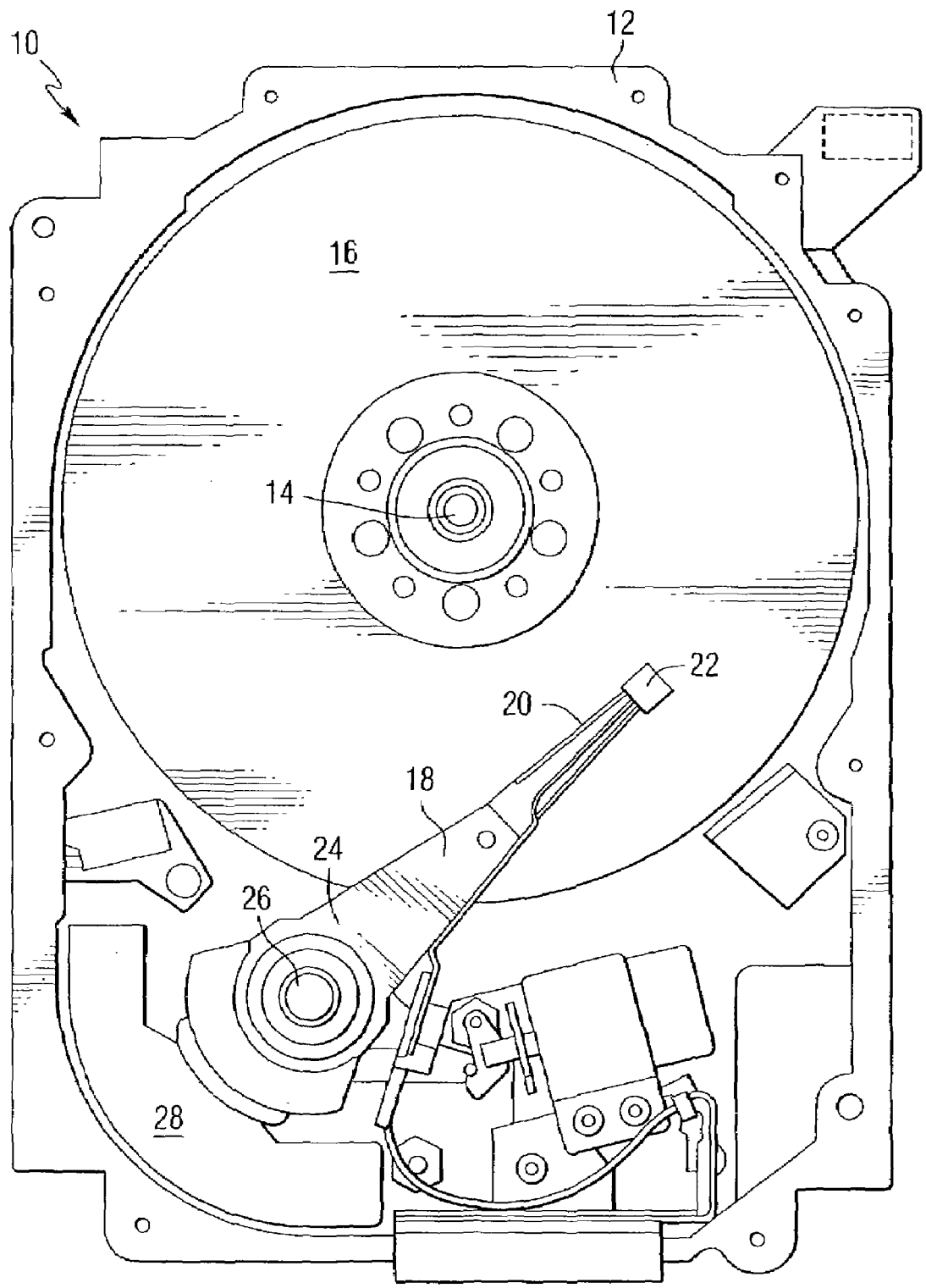
FIG. 1 is a flow diagram that illustrates the method of the invention.

FIG. 1 is a pictorial representation of a disc drive 10 that can utilize this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

Figure 2:
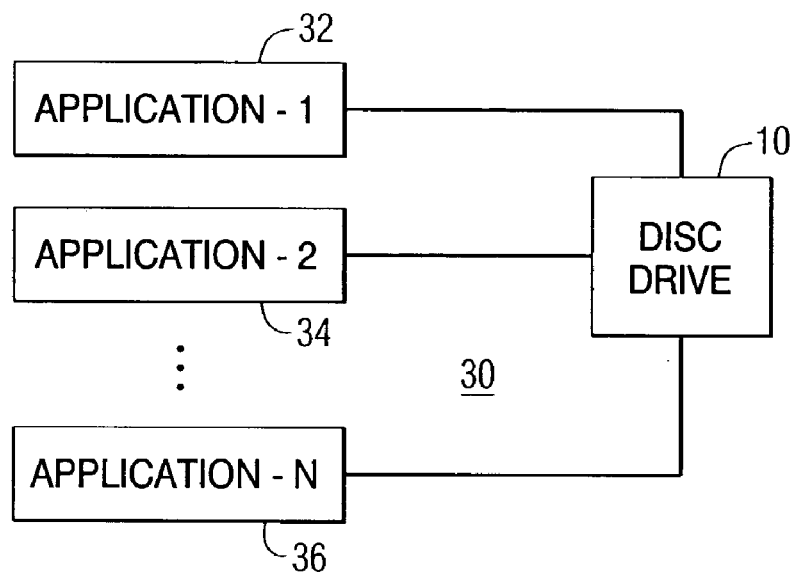
FIG. 2 is a functional block diagram of a system that can use the method of this invention.

FIG. 2 is a schematic representation of a system 30 that can include a disc drive that can process requests in accordance with this invention. The disc drive stores information that can be used by a plurality of applications, illustrated by blocks 32, 34 and 36. The applications can be coupled to the disc drive through an interface and, can communicate with the disc drive in any of several well-known communications channels, including wired or wireless connections or through networks such as local area networks, wide area networks or the internet. The applications can include such devices as computers, personal video recorders, MP3 players, etc. The applications can have different data requirements and can communicate with the disc drive concurrently.

To retrieve data from the disc drive, the applications send requests to the disc drive. A request can be an instruction for the disc drive to retrieve a plurality of bytes of data from a particular location on a disc. An efficient technique is required to satisfy the requests. This invention provides a disc scheduling algorithm, also referred to as a technique, that combines application level information and disc level information.

Figure 3:
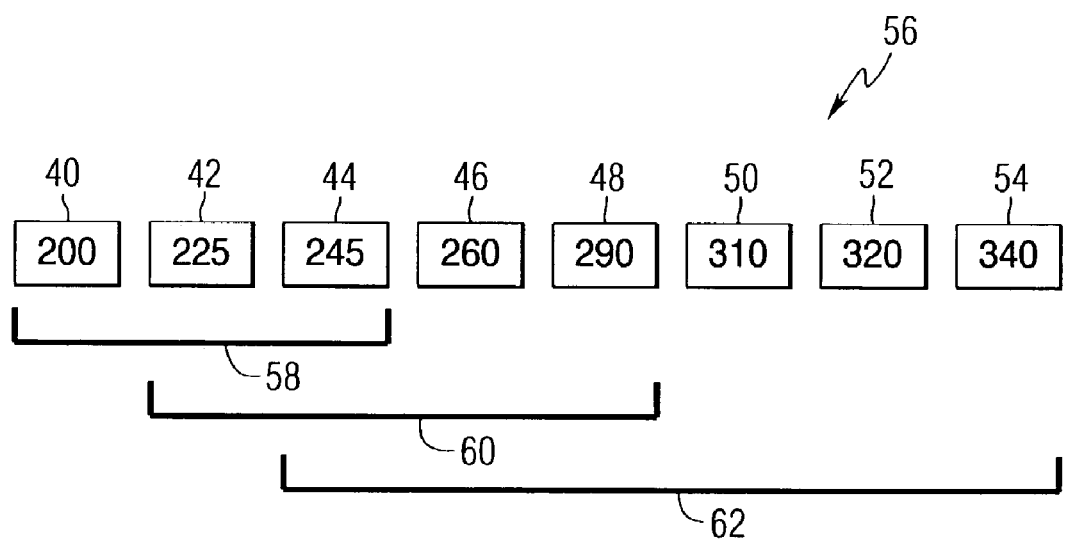
FIG. 3 is a schematic diagram that illustrates some features of the method of the invention.
Figure 4:
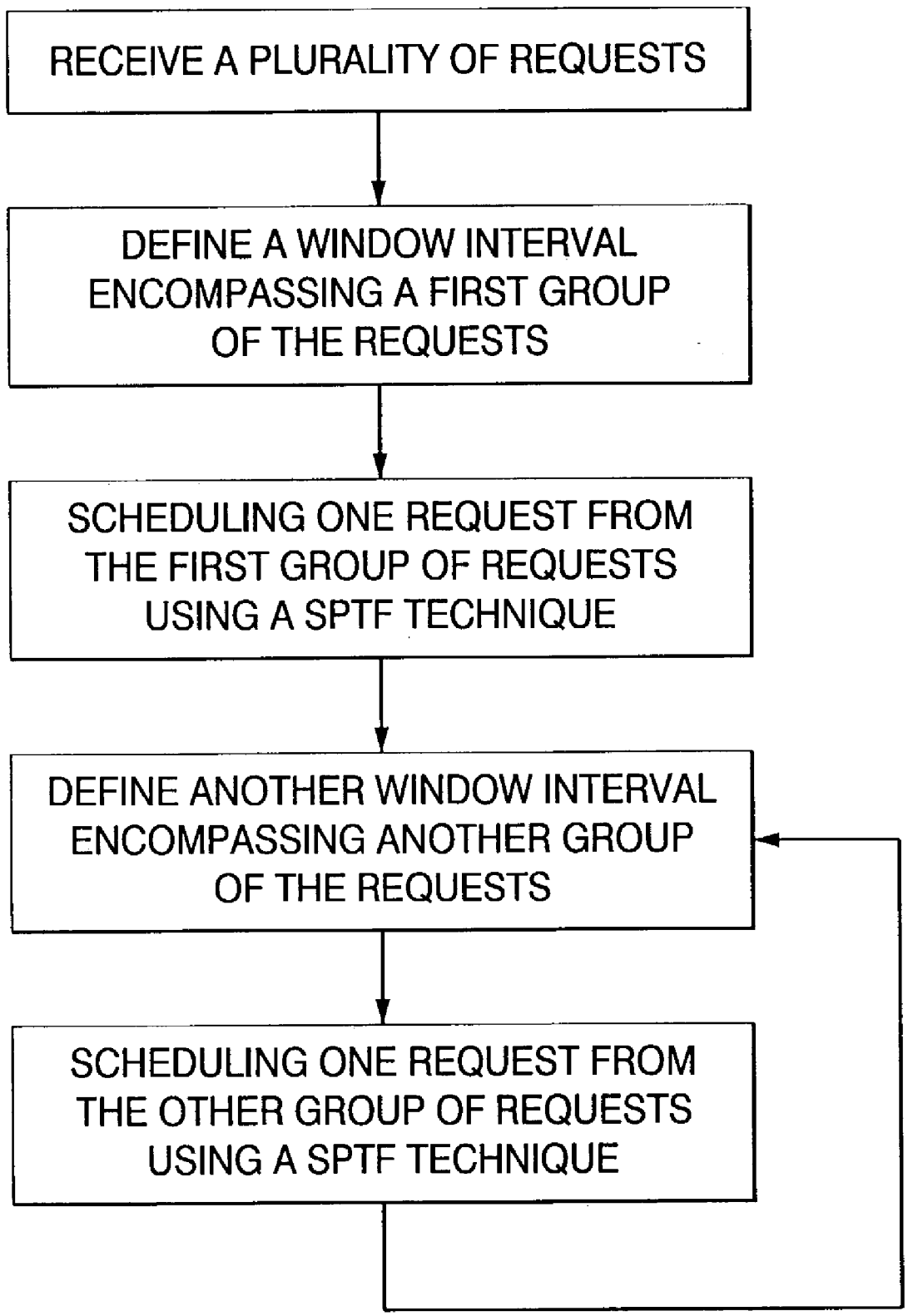
FIG. 4 is a flow diagram that illustrates the method of the invention.

FIG. 3 is a schematic diagram that can be used to describe the method of the invention. A series of requests, illustrated by blocks 40, 42, 44, 46, 48, 50, 52 and 54 are placed in a queue 56. In the example of FIG. 3, each of the requests has a deadline associated with it. A deadline is a time limit in which the request must be filled. In FIG. 3, the numbers within the blocks represent deadline times in milliseconds.

The method of this invention schedules outstanding requests based on application level information (for example, deadlines) while optimizing performance based on the positions of the pool of outstanding requests relative to the current head position (i.e., disc level information). This invention can be implemented using window-based technique that includes a semantically-aware disc scheduling algorithm. Semantically-aware refers to the fact that the disc scheduling algorithm uses the information received from the application about the application's needs (e.g. deadlines) when scheduling the requests. In one example of the invention, a SPTF-EDF method combines deadline information from the application with detailed on-disc scheduling for significantly improved performance. A window is a time interval that encompasses the request with the application level information of interest, for example the shortest deadline, and can include additional requests that have application level information of interest occurring within the window time interval. In FIG. 3, line 58 represents a window. The window length in this example is 50 milliseconds, such that requests 40, 42 and 44 fall within the window. Once the requests that fall within the window have been identified, one of those requests is scheduled using an algorithm that takes into account disc information. One example of such an algorithm is a Shortest Positioning Time First (SPTF) algorithm. After one request from within the window has been scheduled, the window length can be adjusted to encompass additional requests. In FIG. 3, assume that request 40 is scheduled and removed from the queue. Then line 60 represents the adjusted window. The adjusted window length is this example is 70 milliseconds, such that requests 42, 44, 46 and 48 fall within the window. After the requests that fall within the adjusted time interval have been identified, one of those requests is scheduled using the scheduling algorithm that uses disc information. After that request has been scheduled, the window length can be further adjusted again. In the example of FIG. 3, assume that request 42 is scheduled and removed from the queue. Then the window can be adjusted again, as illustrated by line 62 and the process is repeated. The request in each window that is scheduled can be determined using the Shortest Positioning Time First (SPTF) technique. While the above example shows the request with the shortest deadline as being scheduled, it should be understood that any request within the window can be selected for scheduling using a Shortest Positioning Time First (SPTF) technique. After sorting the requests in the order of deadlines, the window-based SPTF-EDF example uses the shortest positioning time first (SPTF) technique to schedule those requests whose deadlines fall within a sliding-window. In this way, both the requests are serviced before their deadlines and disc scheduling is optimized for maximum disc resource utilization. As illustrated in FIG. 3, the pool of requests is determined by a sliding-window mechanism. In addition, the length of the window can be dynamically adjusted by taking into account load in the system to further improve the efficiency.

The goal of using the sliding-window is to pool the requests with the application level information of interest (for example, the closest deadlines) and apply a scheduling algorithm the that uses disc information for only the pooled requests. For example, a window size of 200 milliseconds means that the time distance between any two requests in the pool upon which SPTF will be applied cannot exceed 200 milliseconds. Every time a request is scheduled, the pool of requests (inside the window) is recalculated to account for the newly coming requests.

The window size is dynamically adjusted based on additional disc information (e.g., the system load) and other relevant information from the application. When the system load increases, it is more beneficial to pool more requests for SPTF (i.e., increase the window size). When the system load decreases, it is beneficial to use more of the application level information and keep a smaller pool of requests for SPTF.

With the scheduling method example described above, applications that can tolerate larger response times are essentially donating the extra time they have to those in need of shorter waiting times. For example, a copy/backup application does not have the stringent delay requirements of a multimedia application (or a transaction database) and therefore can tolerate more delay in favor of the multimedia application (transaction database). Another example is that a video playback application with a large buffer can tolerate more delay/jitter than another one with a smaller/no buffer.

Scheduling algorithms such as SPTF are purely optimized for disc performance (i.e., minimum response time) but do not meet needs of the real-time applications. Scheduling algorithms such as EDF are purely optimized for real-time applications but severely lack disc optimizations. With the dynamic window adjustment feature, the window-based SPTF-EDF covers both extremes as well as anything in-between. When the system load is light, window-based SPTF-EDF will perform similar to EDF scheduling the requests to meet their deadlines (using the application level information). When the system load is high, it will behave like SPTF to be able to sustain the system load (using the disc level information). When the system load is average-to-high it will try to schedule the requests before their deadlines as well as optimize the system performance. System load can be defined as the number of outstanding requests at the disc.

The size of the window on which SPTF is applied and the range of deadlines play a crucial role in determining the performance of SPTF-EDF. Ideally, the window should be small so as to encompass the smallest of the deadlines to give precedence to QoS over scheduling performance. This approach will work well under light load conditions. However, as the system load increases, where SPTF is known to perform better than other algorithms, smaller window size penalizes the SPTF-EDF technique.

On the other hand, as the window size is increased the behavior of SPTF-EDF becomes increasingly similar to SPTF. For optimal performance, the window size needs to be fine-tuned based on the current load of the system.

After sorting the requests in the order of deadlines, the SPTF can be allowed to service those requests that are within a time window in the order SPIF sees fit (i.e., optimized seek and rotational latency). The method of this invention cannot only service the requests before their deadlines but also takes advantage of the optimizations that use seek and rotational latency information.

The terms window and window size play an important role in the definition and performance of SPTF-EDF. A window is defined as the time interval within which SPTF is applied to all the requests with a deadline that falls within that time interval. A window size indicates the length of the window. For example, a window size of 200 milliseconds means that the time distance between first and last request in the queue upon which SPTF will be applied cannot exceed 200 milliseconds.

The SPTF-EDF method will perform well on mixed-media workloads as well. Applications that can tolerate larger response times are essentially donating the extra time they have to those in need of shorter waiting times. For example, a copy/backup application does not have the stringent delay requirements a multimedia application (or a transaction database) has and therefore can tolerate more delay in favor of the multimedia application (transaction database). Another example is that a video playback application with a large buffer can tolerate more delay/jitter than another one with a smaller/no buffer. SPTF-EDF also diminishes the main drawback of the SPTF algorithm: starvation. It eliminates this problem by limiting the starvation amount to the window size.

The combined SPTF-EDF technique, by nature, eliminates the main drawback of the SPTF algorithm, i.e., possible request starvation, by controlling the window size, and therefore the number of requests over which the SPTF applies for any given moment in time. This also implies smaller jitter for those applications that are sensitive for it.

Systems that use this invention can include applications that communicate information to the storage device via well-defined interfaces and use it effectively for improving the overall performance of the streaming server.

Specifically, multimedia applications/servers can benefit from a smarter drive by sharing the information they have with the disc about the multimedia content and its delivery channels (e.g., negotiated QoS parameters with the client, the feedback received from the client and network during the playback, etc.). The disc scheduling performed by this invention takes the QoS requirements of the applications into account. SPTF-EDF, is a window-based algorithm that takes advantage of the deadline information it receives from the application when making scheduling decisions. It is different from previous EDF based algorithms like SCAN-EDF in two aspects. In performance: SPTF-EDF combines the Shortest Positioning Time First (SPTF) algorithm, the best performing general purpose disc scheduling algorithm, with Earliest Deadline First (EDF), an algorithm specifically designed for real-time applications. The result is better than any of the previous algorithms in terms of on-time scheduling of requests. In semantics: SPTF-EDF is the first step towards a more intelligent disc scheduling algorithm that takes into account QoS parameters when making scheduling decisions.

This invention improves disc performance for a variety of applications, including multimedia applications. It provides the advantages of a smarter disc that makes more intelligent decisions when servicing requests based on the information received from the applications through an interface with richer semantic. This interface not only communicates the requests, but also QoS parameters such as delay, jitter, reliability, cost, etc. Information used to optimize network performance is also used to improve disc performance. Towards this end, when we looked at the previous multimedia scheduling algorithms like EDF and SCAN-EDF, we observed that their performance suffers due to high seek and rotational latencies.

An inherent characteristic of multimedia applications is that they can tolerate some level of data loss provided that the loss is not bursty. Human perception will not detect occasional disconnects that might happen in a playback of a movie provided that the disconnect length does not exceed certain threshold (typically on the order of milliseconds). Therefore, occasional data losses in the playback will not be noticed. In this respect, a scheduling algorithm that evenly distributes deadline misses will benefit the user more than one that misses deadlines in bursts.

In another aspect, the invention encompasses an apparatus for processing requests for information from a disc drive comprising: means for receiving a plurality of requests, wherein each of the requests has a set of application requirements (e.g. a deadline) associated with it; means for identifying a first group of the requests that fit within a time interval; means for using a scheduling algorithm with disc information (e.g. Shortest Positioning Time First (SPTF)) scheme to schedule one of the requests in the first group; means for adjusting the length of the time interval; means for identifying another group of the requests that fit within the adjusted time interval; and means for using a scheduling algorithm with disc information (e.g. Shortest Positioning Time First (SPTF)) scheme to schedule one of the requests in the other group. The various steps of the method can be performed in a disc controller. In that case, the disc controller would serve as means for performing the steps of the method. The disc controller can be contained within the block labeled disc drive 10 in FIG. 2.

While the invention has been described in terms of several embodiments, it will be apparent to those skilled in the art that various changes can be made to the disclosed examples without departing from the scope of the invention as defined by the following claims.

What is claimed is:

1. A method for processing requests for information from a disc drive comprising:
   (a) receiving a plurality of requests, wherein each of the requests has application level information associated with it;
   (b) identifying a first group of the requests that fit within a time interval;
   (c) using a scheduling algorithm with disc information to schedule one of the requests in the first group;
   (d) dynamically adjusting the length of the time interval;
   (e) identifying another group of the requests that fit within the adjusted time interval;
   (f) using the scheduling algorithm to schedule one of the requests in the other group; and
   (g) repeating steps (d), (e) and (f).

2. The method of claim 1, wherein the application level information is a deadline.

3. The method of claim 1, wherein the scheduling algorithm is a Shortest Positioning Time First (SPTF) algorithm.

4. The method of claim 1, wherein the disc information comprises one of: a disc surface parameter or disc surface variations.

5. The method of claim 1, wherein the time interval encompasses the request having a shortest deadline.

6. The method of claim 1, wherein the time interval is adjusted based on a number of unscheduled requests.

7. The method of claim 1, wherein the plurality of requests are placed in a queue and grouped according to deadlines.

8. The method of claim 1, further comprising:
   outputting information in response to each of the scheduled requests.

9. An apparatus for processing requests for information from a disc drive comprising:
   means for receiving a plurality of requests, wherein each of the requests has application level information associated with it;
   means for identifying a first group of the requests that fit within a time interval;
   means for using a scheduling algorithm with disc information to schedule one of the requests in the first group;
   means for dynamically adjusting the length of the time interval;
   means for identifying another group of the requests that fit within the adjusted time interval; and
   means for using the scheduling algorithm to schedule one of the requests in the other group.

10. The apparatus of claim 9, wherein the application level information is a deadline.

11. The apparatus of claim 9, wherein the scheduling algorithm is a Shortest Positioning Time First (SPTF) algorithm.

12. The apparatus of claim 9, wherein the disc information comprises one of: a disc surface parameter or disc surface variations.

13. The apparatus of claim 9, wherein the time interval encompasses the request having a shortest deadline.

14. The apparatus of claim 9, wherein the time interval is adjusted based on a number of unscheduled requests.

15. The apparatus of claim 9, wherein the plurality of requests are placed in a queue and grouped according to deadlines.

16. The apparatus of claim 9, further comprising:
   means for outputting information in response to each of the scheduled requests.

17. An apparatus for processing requests for information from a disc drive comprising:
   a data storage medium; and
   a controller for receiving a plurality of requests for writing data to the data storage medium and/or reading data from the data storage medium, wherein each of the requests has application level information associated with it, wherein the controller identifies a first group of the requests that fit within a time interval, uses a scheduling algorithm with disc information to schedule one of the requests in the first group, dynamically adjusts the length of the time interval, identifies another group of the requests that fit within the adjusted time interval, and uses the scheduling algorithm to schedule one of the requests in the other group.

18. The apparatus of claim 17, wherein the time interval encompasses the request having a shortest deadline.

19. The apparatus of claim 17, wherein the time interval is adjusted based on a number of unscheduled requests.

20. The apparatus of claim 17, wherein the plurality of requests are placed in a queue and grouped according to deadlines.

* * * * *

UNITED STATES PATENT AND TRADEMARK OFFICE
CERTIFICATE OF CORRECTION

PATENT NO.        : 7,073,021 B2
APPLICATION NO. : 10/393566
DATED             : July 4, 2006
INVENTOR(S)       : Sami Iren et al.

It is certified that error appears in the above-identified patent and that said Letters Patent is hereby corrected as shown below:

Col. 1, Lines 50-53
After "path." delete "It allows seek time optimizations while reducing the response time variance. disc head back and forth across all the cylinders and servicing the requests along the path."

Col. 5, Line 24
"...algorithm the that..." should read -- algorithm that --

Col. 6, Line 12
"SPIF" should read -- SPTF --

Signed and Sealed this

Sixth Day of March, 2007

JON W. DUDAS
*Director of the United States Patent and Trademark Office*